3,326,903
17β-(SUBSTITUTED-OXY)-5α-ANDROST-2-ENES
Paul D. Klimstra, Northbrook, Ill., assignor to G. D. Searle & Co., Chicago, Ill., a corporation of Delaware
No Drawing. Filed Apr. 29, 1965, Ser. No. 451,972
5 Claims. (Cl. 260—239.55)

The present invention is concerned with novel steroidal derivatives characterized by a complex oxygenated substituent at the 17-position and by a mono-olefinic A-ring and, more particularly, with 17β-(substituted-oxy)-5α-androst-2-enes which can be represented by the following structural formula

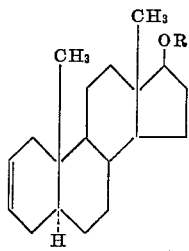

wherein R can be a tetrahydropyran-2-yl, trifluoroacetyl, 2,2,2-trichloro-1-hydroxyethyl or

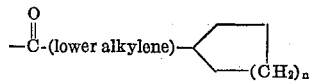

radical.

In the latter representation, n can be a positive integer less and 3 and the radicals denoted as lower alkylene are typified by methylene, ethylene, trimethylene, tetramethylene and pentamethylene, i.e., those containing fewer than 6 carbon atoms.

Especially preferred compounds of this invention are those represented by the following structural formula

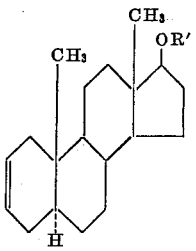

wherein R' is a tetrahydropyran-2-yl, trifluoroacetyl or

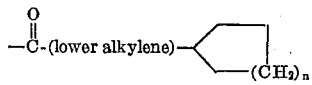

radical, the latter substituent being as hereinbefore defined.

The compounds of this invention can be manufactured conveniently by utilizing as a starting material 17β-hydroxy-5α-androst-2-ene. The reaction of that substance, for example with dihydropyran in the presence of an acid catalyst such as p-toluenesulfonic acid, results in 17β-tetrahydropyran-2-yloxy-5α-androst-2-ene. When that starting material is heated with chloral in benzene solution and the water formed is removed azeotropically, the instant 17β-(2,2,2-trichloro-1-hydroxyeth)-oxy-5α-androst-2-ene is produced. The reaction of 17β-hydroxy-5α-androst-2-ene with the appropriate acid halide or anhydride, preferably in the presence of a suitable acid catalyst such as pyridine, results in the substituted acyloxy compounds of the present invention. As a specific example, when that starting material is contacted with 3-cyclopentylpropionyl chloride in the presence of pyridine at the reflux temperature, the instant 17β-(3-cyclopentylpropionyl)oxy-5α-androst-2-ene is obtained. Use of trifluoroacetic anhydride and pyridine at room temperature, on the other hand, results in 17β-trifluoroacetoxy-5α-androst-2-ene.

The compounds of the present invention are useful as a result of their valuable pharmacological properties. They are hormonal agents, for example, which possess the particular advantage of lacking anti-hormonal side effects. In particular, they exhibit anabolic and androgenic properties but lack anti-fertility and anti-estrogenic side effects.

The invention will appear more fully from the examples which follow. These examples are set forth by way of illustration only and it will be understood that the invention is not to be construed as limited either in spirit or in scope by the details contained therein as many modifications in materials and methods will be apparent from the disclosure to those skilled in the art. In these examples temperatures are given in degrees Centigrade (° C.). Quantities of materials are expressed in parts by weight unless otherwise noted.

*Example 1*

To a solution of 3 parts of 17β-hydroxy-5α-androst-2-ene in 134 parts of methylene dichloride is added successively 3.3 parts of dihydropyran and 0.01 part of p-toluenesulfonic acid monohydrate. The resulting reaction mixture is stored at room temperature for about 48 hours, then is stripped of solvent by distillation under reduced pressure. The residual dark oil is purified by chromatography on silica gel followed by elution with benzene. The eluted fraction is recrystallized from methanol to afford pure 17β-(tetrahydropyran-2-yl)oxy-5α-androst-2-ene, melting at about 84–85°. This compound can be represented by the following structural formula

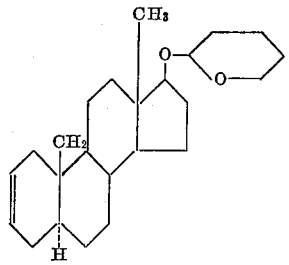

*Example 2*

To a solution of 2 parts of 17β-hydroxy-5α-androst-2-ene in 19.6 parts of pyridine is added, with stirring and cooling, 12 parts of trifluoroacetic anhydride over a period of about 2 minutes. The reaction mixture is stirred at room temperature for about one hour, after which time a mixture of 16 parts of dioxane and 8 parts of water is added with cooling. After standing for about 15 minutes, that mixture is poured into ice-cold water and the resulting precipitate is collected by filtration, washed successively with water, 5% hydrochloric acid, and water, then dried in air. Recrystallization of that crude product from aqueous methanol produced 17β-trifluoroacetoxy-5α-androst-2-ene, melting at about 93.5–95°. This compound exhibits an optical rotation of +27.5° in chloroform and can be represented by the following structural formula

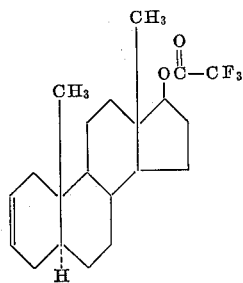

Example 3

A solution of 20 parts of 17β-hydroxy-5α-androst-2-ene in 1400 parts of benzene is slowly distilled in order to remove the water. To that anhydrous mixture is then added successively 8 parts of pyridine and 1.8 parts of 3-cyclopentylpropionyl chloride, and the resulting reaction mixture is heated at the reflux temperature for about 45 minutes. At the end of the reaction period, the mixture is washed successively with water, 10% aqueous sodium carbonate, and water, then dried over anhydrous sodium sulfate containing decolorizing carbon. Removal of the solvent by distillation under reduced pressure affords a waxy solid residue. That crude product is purified by chromatography on silica gel, followed by elution with benzene to afford 17β-(3-cyclopentylpropionyl)oxy-5α-androst-2-ene, melting at about 57.5–58.5°. This compound exhibits an optical rotation of +43.5° in chloroform and can be represented by the following structural formula

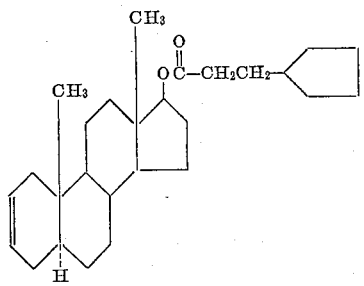

Example 4

The substitution of an equivalent quantity of 4-cyclohexylbutyryl chloride in the procedure of Example 3 results in 17β-(4-cyclohexylbutyryl)oxy-5α-androst-2-ene.

Example 5

A solution of 2.7 parts of 17β-hydroxy-5α-androst-2-ene in 44 parts of benzene is distilled until anhydrous, then is cooled. To that dry solution is added 1.8 parts of trichloroacetaldehyde, and the resulting mixture is heated at the reflux temperature with stirring for about one hour. It is then cooled to room temperature and allowed to stand for about 16 hours. The solvent is removed by distillation under reduced pressure, in a nitrogen atmosphere, and the resulting residue is crystallized from aqueous acetone to afford pure 17β-(2,2,2-trichloro-1-hydroxyeth)oxy-5α-androst-2-ene, melting at about 154.5–156°. This compound is represented by the following structural formula

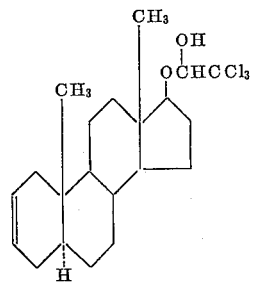

What is claimed is:
1. A compound of the formula

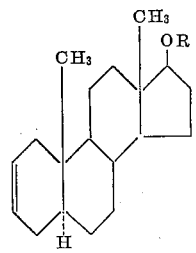

wherein R is a member of the class consisting of tetrahydropyran-2-yl, trifluoroacetyl and

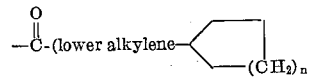

radicals, $n$ being a positive integer less than 3.

2. 17β - tetrahydropyran - 2 - yloxy - 5α - androst - 2-ene.
3. 17β-trifluoroacetoxy-5α-androst-2-ene.
4. A compound of the formula

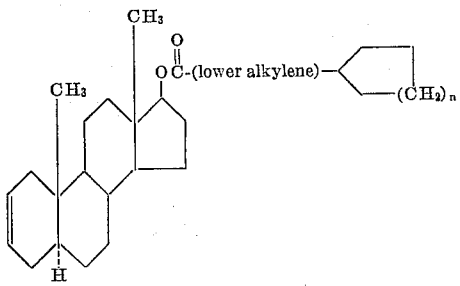

$n$ being a positive integer less than 3.

5. 17β - (3 - cyclopentylpropionyl)oxy - 5α - androst-2-ene.

No references cited.

LEWIS GOTTS, *Primary Examiner.*

HENRY FRENCH, *Assistant Examiner.*